United States Patent [19]
Greenberg

[11] 3,744,775
[45] July 10, 1973

[54] MIXING OF MOLTEN PLASTIC AND GAS
[75] Inventor: Walter H. Greenberg, Syosset, N.Y.
[73] Assignee: Bischoff Chemical Corporation, Hicksville, N.Y.
[22] Filed: Feb. 2, 1972
[21] Appl. No.: 223,022

Related U.S. Application Data
[62] Division of Ser. No. 17,246, March 6, 1970, abandoned.

[52] U.S. Cl..... 261/122, 261/DIG. 26, 261/DIG. 75
[51] Int. Cl.................................................. B01f 3/04
[58] Field of Search..................... 261/DIG. 26, 122, 261/DIG. 75; 264/50; 425/4, 4 C, 817, 817 C

[56] References Cited
UNITED STATES PATENTS

| | | | |
|---|---|---|---|
| 2,825,413 | 3/1958 | Williams | 261/DIG. 26 |
| 3,118,958 | 1/1964 | White | 261/DIG. 26 |
| 3,122,327 | 2/1964 | Wiedorn | 261/DIG. 26 |
| 3,251,092 | 5/1966 | Printz | 264/50 |
| 3,466,705 | 9/1969 | Richie | 425/4 C |
| 3,588,955 | 6/1971 | Azuma | 425/4 |

*Primary Examiner*—Tim R. Miles
*Attorney*—John R. Ewbank

[57] ABSTRACT

Gas is injected into a flowing stream of molten plastic to provide a mixture containing an amount of gas which at ambient conditions would constitute about 10 percent to about 98 percent of the volume of the mixture. A relatively thin, large diameter annular stream of molten plastic advances through the mixing zone, the gas being injected into the mixture through at least one of the generally cylindrical walls of the mixing zone. Of particular importance, the gas is injected through a porous wall having more than a thousand openings per square centimeter, such as an ultra-fine sintered glass filter type of gas diffusion member. Each of the walls of the mixing zone is desirably tapered, so that the thickness of the molten cellular plastic effluent is greater than the thickness of the entering stream. The mixture advances through a length of mixing zone which is from about 10 to about 100 times the marginal increase in thickness of the stream. The effluent from the mixing zone flows through a heated stabilization zone which is several times longer than the mixing zone. The stabilized mixture can then be reshaped for flowing into streams utilizing the mixture of molten plastic and gas.

2 Claims, 2 Drawing Figures

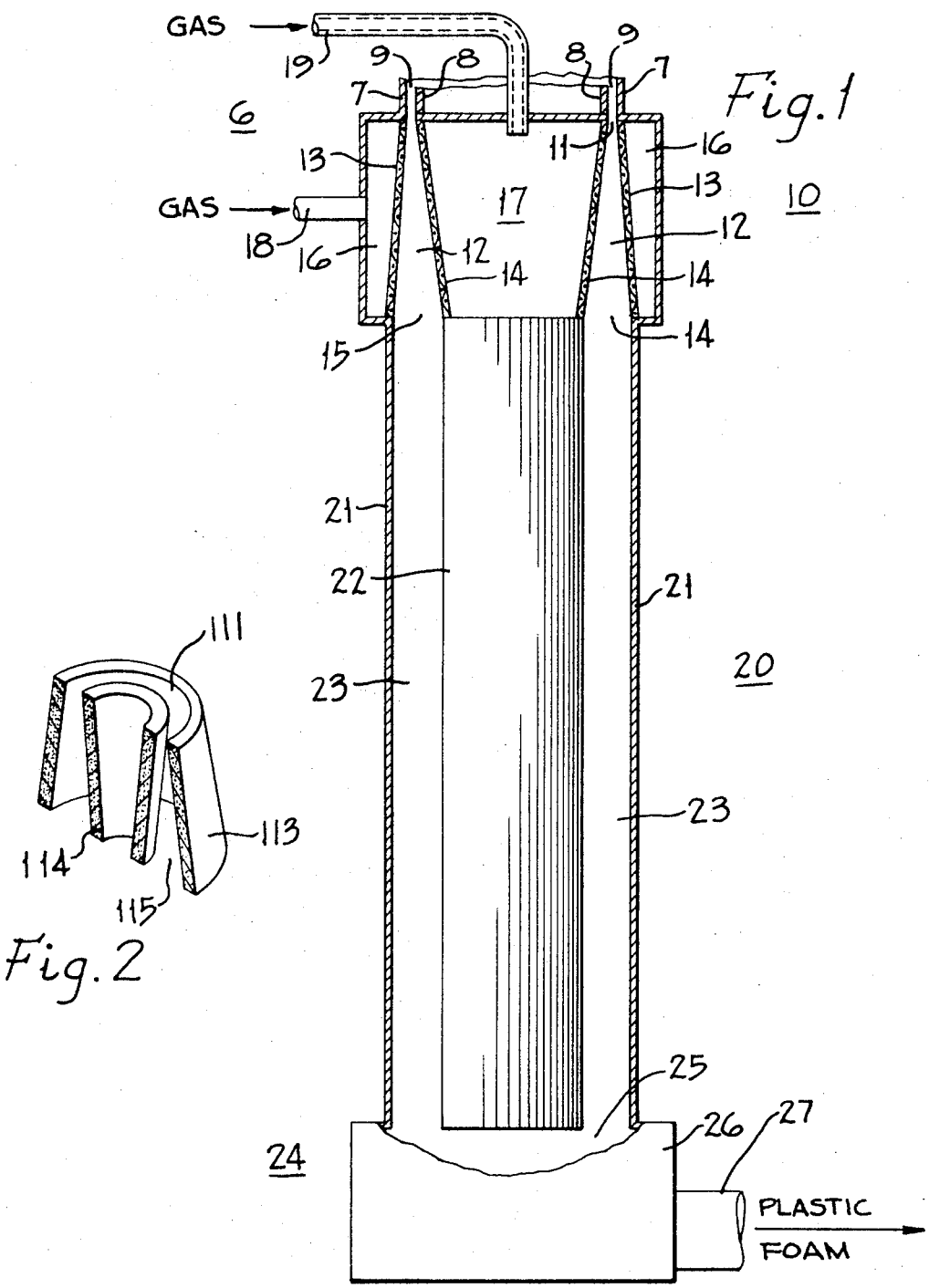

3,744,775

MIXING OF MOLTEN PLASTIC AND GAS

This is a division, of application Ser. No. 17,246, filed Mar. 6, 1970 and now abandoned and replaced by Ser. No. 222,982, filed Feb. 2, 1972.

GENERAL BACKGROUND

Many varieties of plastic organic material have been utilized in cellular form, with gas being introduced into the mixture through decomposable blowing agents, through chemical reactions of isocyanates, through high pressure dissolving of the gas, through mechanical agitative whipping of the precursor, and by other techniques. The cost of the high pressure equipment needed for some procedures has been a deterrent to expansion of the use of such procedures. The autocatalytic propensity toward thermal decomposition of molten plastic has tended to discourage mixing of gas and large static volumes of molten plastic. Some characteristics of mixtures of gas and molten plastic have long been recognized, but the industrial utilization of such mixtures has been delayed because of the absence of satisfactory apparatus and methods for producing such mixtures.

SUMMARY OF INVENTION

In accordance with the present invention, a porous wall having more than 1,000 openings per square centimeter, such as an ultra-fine filter or diffusion member prepared from sintered glass, is employed for the injection of gas into a thin stream of molten plastic flowing adjacent thereto. The molten plastic is shaped into an annular stream and advanced through a generally cylindrical mixing zone. The thickness of the mixture leaving the mixing zone, that is, the distance between the walls confining the stream, is desirably greater that the distance between the walls at the entry to the mixing mixing zone, so that the stream increases in thickness as more gas cells are formed therein. After the mixture leaves the mixing zone, it passes through a stabilizing zone several times longer than the mixing zone. The thus stabilized mixture then flows into a reshaping zone for flowing into apparatus appopriate for utilizing the mixture of gas and plastic.

DESCRIPTION OF DRAWINGS

In the drawings, FIG. 1 is a schematic view of a foam generating apparatus. FIG. 2 is a schematic view of a pair of sintered glass surfaces having a porosity of more than 1,000 openings per square centimeter.

DESCRIPTION OF EMBODIMENTS

A theromplastic such as polypropylene is extruded into a tube, which flows downwardly through a heating zone until the molten plastic has aviscosity about as low as can be tolerated without an excessive decomposition rate. Such low viscosity molten plastic enters apparatus 6 which is maintained at a hot condition having a range close to the temperature as the molten plastic. The molten plastic initially flows between an outer wall 7 and inner wall 8 as an annular stream 9 and advances downwardly to an orifice 11 at the entry of an expansion zone 10. The apparatus features porous surfaces through which gas diffuses, one such surface being an outer cone 13 and the other such surface being an inner cone 14, thus defining an interconal space 12. Each porous surface has more than 1,000 openings / cm$^2$, such as a sintered glass filter, a filter stone or a fine mesh screen of glass fiber or metal wire. The average size opening is less than 250 microns, and ordinarily the openings are significantly smaller than 250 microns. As the plastic flows downwardly, the gas diffusing through the cones 13, 14 is distributed throughout the molten cellular polypropylene, so that the thickness of the stream is increased significantly during the flow from the entry orifice 11 to the exit 15 of the expansion zone 10. The gas diffusing through cones 13, 14, has a tendency to escape through channels along the boundary of the plastic foam and a wall. A stabilizing zone 20 is adapted to minimize such channelling by providing a downflowing stream of cellular plastic. Such stream flows as an annular tube 23 between an outer wall 21 and inner wall 22. The thus stabilized annular stream of molten cellular polypropylene flows into a reshaping zone 24 comprising a plenum chamber 25 defined by a box 26. Any unabsorbed gas is permitted to escape from the reshaping zone 24, so that a useful stream of cellular molten polypropylene can be withdrawn from exit pipe 27. Such stream can be employed in injection molding apparatus.

The pressure at which the gas is supplied is of the magnitude of two atmospheres, so that after the gas has cooled to ambient temperature, the gas cells are at about ambient pressure. The molten plastic is supplied at approximately the same pressure, and the flow of the cellular plastic is partly by gravity and partly by reason of the lower pressure at the exit 27 than at the source of supply of the molten plastic and gas. Propane is a preferred gas for operation of the system, but the system is operable using either gases having ready solubility in hydrocarbons such as difluorodichloromethane, hexafluoroethane, tetrafluoromethane, ethane, methane, dimethyl ether, carbon dioxide, and the like, or gases having limited solubility in hydrocarbons such as nitrogen, air, argon, and the like. The gas diffusing through the porous surfaces is blown into the molten plastic and the increased distance between the porous surfaces corresponds to the extent of expansion of the flowing stream.

The gas diffusing through the porous surfaces has a minimized tendency to channel through the stabilizing zone for escape from the reshaping zone because the length of the stabilizing zone and the flow of the molten plastic foam therethrough tends to resist such channelling of a gas stream. No large pressure differences exist to necessitate unusual safety precautions. Apparatus utilizing thin walls permits transfer of heat for maintenance of a temperature within a suitable range, the range being so narrow that at the molten plastic temperature, reference can be made to a substantially uniform temperature. Certain advantages arise from cooling the reshaping zone and stabilizing zone enough to increase the ease of retention of the gas cells. Although such cooling tends to increase the viscosity of the polypropylene walls of the gas cells, the effective viscosity of the mixture of gas and plastic remains low so that the cellular plastic can flow through the stabilizing zone and reshaping zone without a troublesomely large pressure drop. An excessive temperature drop must be avoided because the volume occupied by the gas is approximately proportional to the absolute temperature, and the significant shrinkage attributable to such cooling is scheduled to occur in the injection molding apparatus and mold, and not in the plastic foam generating apparatus. As the pressure of the system decreases, each gas cell tends to expand, thus expanding the plastic foam. Whatever contraction occurs from cooling is substantially compensated for by expansion due to pressure drop, thus maintaining reasonably uniform foam density throughout the stabilizing zone and reshaping zone.

The use of the annular streams provides significant advantages in simplifying the heat insulation and construction of portions of the stabilizing zone. The invention features the formation of plastic foam by directing a very thin stream of molten plastic of minimized viscosity between two porous surfaces, each having more than 1,000 openings per square centimeter, and gas diffuses through the two porous surfaces into the flowing plastic stream to provide a thicker plastic stream, the gas being pushed through the two porous surfaces at a differential pressure which is less than one atmosphere, the distribution of the gas being controlled by factors such as the thinness of the plastic stream, and the low viscosity of the plastic stream. Automatic controls are desirably employed to assure production of a continuous stream of plastic foam, and to minimize difficulties due to the gas pressure becoming excessive or inadequate or because of the fiscosity of the plastic becoming excessively high or excessively low (excessive decomposition rate of plastic). The expansion zone conditions can be controlled to permit production of plastic foam at a rapid rate. Apparatus for making plastic foam is evaluated by engineers on the basis of the capital cost for producing plastic foam at a particular rate in pounds per hour, and the simplicity of the present apparatus for large scale production helps in making it attractive from the standpoint of capital cost.

It should be noted that the apparatus comprises walls adapted to utilize gravitational froces for aiding the flow of the molten plastic into and through the expansion zone, stabilizing zone, and reshaping zone successively. At the exit of the expansion zone, the walls are farther apart than at the entrance thereto, and the height of the expansion zone is at least 10 times the marginal increase in the distance between the walls. The height of the walls in the stabilizing zone is at least three times the height of the expansion zone. The walls of the stabilizing zone are parallel, non-porous, and the spacing therebetween is the same as the spacing apart of the bottom of the expansion zone walls.

The method can be described as including the steps of advancing a thin stream of molten plastic of low viscosity into an expansion zone, and advancing such stream downwardly while diffusing gas thereinto by tiny bubbles of gas forced into the downwardly moving stream from each side at a small differential pressure whereby the thickness of the downwardly advancing stream increases, the marginal increase of thickness being less than one-tenth the downward travel distance through the expansion zone, advancing the thus thickened stream downwardly for a distance at least three times the travel distance through the expansion zone, and thereafter reshaping the stream to provide a shaped stram of mixture of hot gas and hot molten plastic.

The invention claimed is:

1. Apparatus for preparing a mixture of gas and molten plastic which includes the combination of:
   means directing an annular stream of molten plastic downwardly into an expansion zone, said molten plastic being heated at a temperature close to the temperature of minimum viscosity without significant thermal degradation of the plastic;
   a conical outer wall in the expansion zone, said wall being porous and having more than 1,000 openings per square centimeter;
   a conical inner wall in the expansion zone, said wall being porous and having more than 1,000 openings per square centimeter, the diameter of the lower portion of the cone being smaller than the upper portion of the cone, whereby the distance between the cones at the bottom exit of the expansion zone provides a thickness greater than the thickness of the incoming annular stream, the height of each cone being at least 10 times the marginal increase in thickness of the stream;
   means directing gas through each of the porous cones at a marginal pressure difference less than one atmosphere;
   a stabilizing zone having an inner cylindrical non-porous wall and a parallel outer cylindrical non-porous wall, each maintained at a temperature adapted to preserve the molten condition of the molten plastic, said stabilizing zone being more than three times as high as the height of the expansion zone;
   a reshaping zone in which the annular stream from the stabilizing zone is reshaped into a non-annular stream, whereby a stream of a mixture of gas and molten plastic is withdrawn from the reshaping zone, the temperature of the reshaping zone being maintained at substantially the same temperature as the effluent from the stabilizing zone.

2. Apparatus for preparing a plastic foam which includes the combination of:
   walls defining an expansion zone above a stabilization zone above a reshaping zone, whereby gravity aids the flow of hot molten plastic successively through the expansion zone, stabilizing zone, and reshaping zone;
   a pair of porous walls in the expansion zone, each wall having more than 1,000 openings per square centimeter, said pair of walls being spaced farther apart at the bottom than at the top, the height of the porous walls being more than 10 times the increase in thickness between said walls, said expansion zone being maintained at an elevated temperature imparting low viscosity to the molten plastic, and the hot gas being forced to diffuse through the porous walls by a pressure difference less than one atmosphere;
   a pair of non-porous parallel walls in the stabilizing zone, the spacing between the walls being the same as the spacing apart of the bottom of the expansion zone walls, the height of the stabilizing zone walls being more than three times the height of the expansion zone; and
   an exit tube in the reshaping zone imparting to the effluent stream of hot plastic foam a non-annular shape, whereby the hot plastic foam is withdrawn from the apparatus at a temperature and pressure only slightly less than the temperature and pressure of the hot gas and hot molten plastic supplied to the expansion zone.

* * * * *